United States Patent Office 3,663,451
Patented May 16, 1972

3,663,451
OLEFIN POLYMERIZATION CATALYSTS
Thomas Hill, Falkirk, Scotland, assignor to BP Chemicals Limited, London, England
No Drawing. Filed Jan. 30, 1970, Ser. No. 7,220
Claims priority, application Great Britain, Jan. 30, 1969, 5,195/69
Int. Cl. C07c 3/10
U.S. Cl. 252—431 R        18 Claims

ABSTRACT OF THE DISCLOSURE

Olefin oligomerization and polymerization catalyst containing (a) transition metal bonded to a carrier and a ligand and (b) an aluminium alkyl. A typical embodiment is the combination of (a) nickel bonded to silica, alumina or silica/alumina and acetylacetone and (b) aluminumtriethyl.

---

The present invention relates to a novel heterogeneous olefin polymerization catalyst.

It is known that certain transition metal complexes may be used in the homogeneous polymerization of olefins and more particularly in the production of oligomers from olefins. The use of homogeneous catalysis has the disadvantage that it is difficult or impossible to recover the catalyst from the reaction mixture. It is therefore desirable to use heterogeneous catalysts where possible.

The present invention is a catalytic composition suitable for the polymerization of olefins which comprises (a) a carrier to which is bonded through oxygen atoms the transition metal component of catalytically active transition metal/ligand combination and (b) an alkyl aluminium compound.

The present invention is also a process for the production of catalysts suitable for the polymerization of olefins which comprises carrying out under substantially anhydrous conditions the successive steps of reacting, to form a carrier-halide reaction product, a carrier material having surface hydroxyl groups with the halide of an "active transition metal" as herein defined, reacting the carrier-halide reaction product with an "active ligand" as herein defined, and bringing the resulting product into contact with an aluminium alkyl.

The term "polymerization of olefin" as used in this specification includes both the formation of the low polymers more usually referred to as "oligomers," as well as the formation of high molecular weight polymer e.g. solid or tacky polymer. However the invention finds its main application in the preparation of oligomers.

The term "active transition metal" as used in the specification means a transition metal which forms complexes with a phosphine or β-diketone which are active for the polymerization (including oligomerization) of olefins.

The term "active ligand" when used with reference to a transition metal means in the specification a phosphine or a β-diketone.

The catalysts of the present invention are to be distinguished from mere mixtures of transition metal complexes and carriers. Thus the distribution of polymerization products produced by the mixture is quite different from that produced by the catalyst of the invention.

The catalyst of the present invention are also to be distinguished from transition metal salts bonded to a carrier and treated with aluminium alkyls. The presence of ligands linked to the transition metal, which is in turn linked to the carrier is an essential feature of the invention. If no ligand is present the resulting material will, for example, have no activity of the co-oligomerization of say ethylene and butadiene.

THE CARRIER

Examples of carriers having surface hydroxyl groups which may be used in the present invention are silica, alumina, and silica/alumina. Free water should not be present in the carrier and any free water may be removed by heating the carrier. It may be desirable to continue the heating of the carrier for sufficient time to remove some of the combined water which is in the form of hydroxyl groups. The heating of the carrier may be carried out in a stream of inert gas e.g. nitrogen. Examples of temperatures which may be used in the heating of the carrier are those in the range 100° C. to 800° C. When drying silica, preferred temperatures are those in the range 300° to 400° e.g. 350° C. The duration of heating may vary very widely but in practice heating times of from 2 to 7 hours are preferred. The particular combination of temperature and time of heating used will depend upon the amount of free and combined water to be removed.

THE REACTION OF THE CARRIER AND TRANSITION METAL HALIDE

The carrier is caused to react with the "active transition metal" halide. The term "halide" includes oxyhalide. The halide is most conveniently the chloride. The transition metal may for example be any of the metals of the first transition series and is preferably nickel. Examples of suitable compounds are the oxy-halides of chromium, vanadium, molybdenum, tungsten and halides of cobalt, iron, tin, and antimony. An example of a preferred halide is nickel (II) chloride.

The transition metal halide may be reacted with the surface hydroxyl groups of the carrier by any convenient method. Thus the halide may be dissolved in a solvent and the carrier impregnated with the resulting solution. It is most desirable that the solvent should be substantially anhydrous and an example of a suitable solvent is dry ethanol.

It may also be possible to feed certain transition metal halides e.g. $TiCl_4$, $CrO_2Cl_2$ to the reaction with surface hydroxyl groups in the form of a vapour.

The transition halide may be caused to react with the hydroxyl groups by heating the halide and carrier together at temperatures in the range 200° C. to 800° C. for example temperature in the range 450° to 600° C. and in particular in the range 500° to 550° C.

The reaction between the transition metal halide and the surface hydroxyl group proceeds with evolution of hydrogen halide and the course of the reaction may be followed by measuring the quantity of hydrogen halide produced. If say a transition metal halide in the +2 oxidation stage with two halide atoms bound to the transition metal atom is used then the reaction of the transition metal halide so that each transition metal atom is bonded to the carrier by one metal oxygen bond will correspond to 50% of the halogen originally fed as the halide being recovered as hydrogen halide. It is thus possible to ensure that the reaction between the transition metal halide and the carrier to give one carrier-metal bond goes substantially to completion by ensuring that a reaction continues until the appropriate percentage of the halogen originally fed as halide is recovered by hydrogen halide. This is desirable in the case of nickel (II) chloride, but is not critical.

The quantity of transition metal halide deposited on the carrier may vary over a moderately wide range. The maximum quantity of nickel which can be deposited on the carrier will depend upon the quantity of surface hydroxy groups e.g. with silica gel this will depend on surface area and predrying temperature. With silica gels of 300–600 m.²/g. surface area pre-dried at 300–400° C. up to 10% nickel could be bound. Thus the carrier may contain 1–10% e.g. 5%, of transition metal by weight based on carrier.

THE REACTION WITH THE LIGAND

The carrier-halide reaction product is then reacted with the "active ligand" (as hereinbefore defined). The specific phosphine or β-diketone ligand used may depend upon the particular transition metal used and the particular product desired from the olefin polymerisation. Examples of phosphine and diketone ligands which may be used are triphenyl phosphine, tributyl phosphine, and acetyl acetone.

The reaction with the lagand may be carried out by heating the carrier-transition metal halide reaction product with the ligand. The temperature used will depend upon the particular combination of transition metal and the ligand used. Examples of suitable temperatures are those in the range 60 to 120° C.

The duration of the reaction may be varied over a moderately wide range. Examples of times which may be used are those in the range 2 to 24 hours. For example times of about 5 hours. Hydrogen halide may be evolved in the course of the reaction with e.g. acetyl acetone and the reaction may be followed by measuring the hydrogen halide given off. It is thus possible to determine when a reaction is complete i.e. when all the halide has reacted.

The reaction may be carried out for example by refluxing the ligand, if a liquid, with the carrier-halide reaction product. Alternatively in a preferred procedure the ligand may be dissolved in the solvent for example toluene which is then refluxed.

Small quantities of the free metal complex, i.e. complex which is not bound to the carrier, may be formed in the course of the reaction between the ligand and the carrier-halide reaction product. This free metal complex may be removed for example by extraction with solvent.

THE TREATMENT WITH ALUMINIUM ALKYL

The product obtained after the reaction with the ligand is then brought into contact with an aluminium alkyl. The aluminium alkyls may for example be aluminium trialkyls, but aluminium chloro-alkyl or aluminium alkyl hydride and aluminium diethyl alkoxides may also be used.

Examples of specific aluminium alkyls which may be used are $Al(Et)_3$, $Al(Et)Cl_2$.

The quantity of aluminium alkyl used may vary over a moderately wide range. The optimum quantity of aluminium alkyl will depend on the specific catalyst system used. Thus for acetylacetonate nickel silica catalysts the ratio of gram atoms aluminium to gram atoms of nickel brought into contact is preferably not more than 2:1 and is preferably about 1:1 e.g. 0.8:1 to 1.2:1. For triphenyl phosphine-nickel-silica catalysts the preferred ratio is about 6:1 e.g. 5:1 to 7:1.

THE POLYMERISATION OF OLEFINS

The process of the present invention may be used to polymerise a variety of olefins for example for the polymerisation of ethylene, propylene, and mixtures of ethylene and butadiene. Thus catalysts made according to the invention from silica, nickel (II) chloride, acetyl acetone, and aluminium trialkyl may be used to polymerise propylene to give hexenes and also semi-solid polymer while the product obtained from silica, nickel (II) chloride, triphenyl phosphine and $Al(Et)Cl_2$ may be used to co-oligomerise ethylene and butadiene to give $C_6$, $C_5$, $C_{10}$, $C_{12}$ diolefins.

The invention will now be described with reference to the following examples.

EXAMPLE 1

Part A

Preparation of chloro-nickel-silica.—20 g. of 969 Grade silica was impregnated with an ethanol solution of nickel a stream of nitrogen at 350° C. for 5 hours. The dried silica was impregnated with an ethanol solution of nickel chloride to give a nickel content of 5%. Solvent was removed by evaporation under vacuum and the nickel-chloride silica combination was heated in a nitrogen stream (alumina dried) to 500° C.–550° C. in a tubular glass furnace equipped with an exit run dipping into distilled water containing methyl orange indicator. As the solid was heated the HCl evolved and dissolved in the water was titrated with standard alkali. Using this procedure, heating was continued until about 50% of the added chlorine was removed. The grey-brown solid was analysed for chlorine, and then found to contain 50% of the chloride added as nickel chloride.

Part B

Preparation of acetyl-acetonate-nickel silica.—This was carried out in two ways:

(a) 6 g. of the chloro-nickel-silica preparation was heated in acetyl acetone (30 cc.) under reflux for five hours until the solid became pale green in colour. During this time, HCl was evolved (detected by neutralisation with alkali and precipitation of silver chloride). It was also noted that a small amount of free neckel acetyl acetonate was formed. A small proportion of free nickel acetyl acetonate was removed from the solid by soxhlet extraction with benzene.

(b) In order to minimise extraction of nickel as free Ni-acetyl acetonate, a modified method was adopted, in which the chloro-nickel silica was heated under reflux in toluene containing 20% excess of acetyl acetone over that required to replace stoichiometrically all the chlorine in the chloro-nickel-silica preparation. Again HCl evolution was detected and used as an indication of completeness of reaction. The catalyst was soxhlet extracted as before to ensure removal of any free nickel acetyl acetonate.

Part C

Activation of acetyl-acetonate-nickel silica (acac nickel silica) and reaction of olefin.—A series of experiments was carried out in which acetylacetonate nickel-silica product obtained from the procedure of Part B were introduced into an autoclave under a nitrogen atmosphere. The autoclave was sealed and evacuated for several hours at 100° C. Nitrogen was again admitted and then a solution of aluminium triethyl in thoroughly dried oxygen-free n-octane was added in the amount required to give a desired Al/Ni atomic ratio. The autoclave was again sealed and connected to a propylene cylinder, and the connecting lines and manifold evacuated and purged. Liquid propylene was then fed to the autoclave. This propylene, which had been dried over a 5 A. activated molecular sieve, contained less than 5 p.p.m. of oxygen and less than 10 p.p.m. of acetylenes. The autoclave was then heated and shaken for the desired reaction time to the desired reaction temperature. The quantity of acetylacetone-nickel-silica product used, the atomic ratio of aluminium (in the form of aluminium triethyl) to nickel (in the form of acetylacetonate-nickel-silica) introduced into the oligomerisation reactor, the weight of propylene charged, reaction temperature reaction time, and the results obtained are shown in Table 1 under runs 1 to 7. The catalysts used in runs 1 to 5 were prepared using method (b) of Part B of the example while the catalysts used in runs 6 and 7 were prepared using method (a) of Part B.

EXAMPLE I

In a comparative example, not according to the invention, two samples of chloro-nickel silica alone, prepared as in Example 1, Part A was treated with aluminium triethyl to give an Al:Ni ratio of 1:1 and 2:1 respectively, and used to polymerize propylene as in Example 1, part C.

The conditions used and results obtained are given in Table 2, runs 1 and 2.

It will be seen that in contrast to the catalysts of Example 1 only trace amounts of dimer and no higher polymers were formed.

EXAMPLE II

In a comparative example not according to the invention a mixture of dried silica gel, aluminium triethyl and nickel acetyl acetonate in which the gram atom ratio of aluminium to nickel is 1:1, was used to polymerize propylene as in Example 1, Part C. The reaction conditions used and the results obtained are given in Table 2, run 3. This catalyst was not heterogeneous solutions or colloidal dispersions of nickel-containing species being formed.

EXAMPLE 2

Part A

Triphenyl phosphine chloro-nickel silica preparations.—2.5 g. of chloro-nickel silica (5% Ni) preparation, made as in Example 1 Part A were covered with alumina-treated high purity "Analar" grade toluene in which was dissolved 1 g. tri-phenyl phosphine. The system was heated under reflux for one hour under nitrogen, solvent removed by siphoning, and the catalyst dried by nitrogen blowing at room temperature or slightly elevated temperature. A marked colour change from the grey brown of the chloro-nickel silica to a dark grey violet was observed.

Part B

Aluminium chloro-alkyl solutions.—Aluminium chloro-alkyl solutions were prepared in deoxygenated n-nonane or n-pentane which had been dried with alumina, by first dissolving aluminium triethyl, then adding the appropriate quantity of freshly sublimed aluminium chloride, and shaking for several hours whilst maintaining a stream of nitrogen.

Part C

Procedure for butadiene-ethylene oligomerisation.—About 1 g. of catalyst prepared in Part A was transferred to a bomb purged with nitrogen. The bomb was sealed and evacuated for 15–30 minutes at 50° C., cooled under nitrogen and the appropriate volume of a solution of aluminium chloro-alkyl in pentane or nonane added. When pentane was used as solvent, the bomb was heated for 15 minutes at 50° C., and pentane partially vented off. Butadiene was admitted whilst the bomb was cooled in Dry Ice, until the required weight had been taken up. The bomb was then connected to an ethylene (polymerisation grade) reservoir at 300 p.s.i.g. pressure, by a flexible hose and reaction carried out with shaking at the reaction temperature. Products were removed by first cooling the bomb in Dry Ice, venting off excess ethylene and distillation.

TABLE 2

| Run Number | 1 | 2 | 3 |
|---|---|---|---|
| Catalyst type | Chloro-nickel silica | Chloro-nickel silica | Ni-Ac-Ac plus SiO (mixture) |
| Wt. catalyst used, g | 0.97 | 0.27 | 1.0 SiO, 0.3 Ni-Ac-Ac |
| Al/Ni ratio used in preparation | 1.0 | 2.0 | 1.0 |
| Wt. propylene charged | 25 | 3.0 | 20 |
| Reaction temperature, °C | 25 | 40 | 40 |
| Reaction time, hours | 16 | 24 | 24 |
| Products formed | Trace $C_6$ | No products | $C_6$ Olefin |
| Composition of dimer, mol percent: | | | |
| 4-methylpentene-1 | 5.3 | | 0.5 |
| Cis-4-methylpentene-2 | 3.7 | | 1.3 |
| 2,3-dimethylbutene-1 | 2.1 | | 0.7 |
| Trans-1-methylpentene-2 | 22.1 | | 2.0 |
| 2-methylpentene-1 | 5.8 | | 5.4 |
| Hexene-1 | 4.5 | | 1.7 |
| cis-Hexene-3 | 0.4 | | 5.4 |
| trans-Hexene-3 | 1.2 | | 7.0 |
| trans-Hexene-2 | 27.5 | | 28.6 |
| 2-methylpentene-2 | 8.4 | | 14.2 |
| Cis-3-methylpentene-2 | 0.1 | | 0.5 |
| cis-Hexene-2 | 16.6 | | 32.3 |
| Trans-3-methylpentene-2 | 0.2 | | Nil |
| 2,3-dimethylbutene-2 | 1.5 | | 0.4 |
| Total | 99.6 | | |
| Percent normal hexenes in dimer | 50.2 | | 75 |
| Percent 1-olefin in dimer | 17.7 | | 8.3 |

TABLE 1

| Run number | 1 | 2 | 3 | 4 | 5 | 6 | 7 |
|---|---|---|---|---|---|---|---|
| Wt. catalyst used, g | 0.42 | 0.567 | 0.456 | 0.423 | 0.788 | 1.15 | 1.11 |
| Al/Ni ratio used in preparation | 1.0 | 1.0 | 2.0 [1] | 4.0 [1] | 1.0 | 1.0 | 1.0 |
| Wt. propylene charged | 3.5 | 3.3 | 3.6 | 3.5 | 32 | 56 | 52.5 |
| Reaction temperature, °C | 40 | 80 | 40 | 40 | 40 | 40 | 40 |
| Reaction time, hours | 24 | 24 | 24 | 24 | 60 | 24 | 24 |
| Products formed | $C_6$ olefin plus tacky polypropylene | $C_6$ olefin plus tacky polypropylene | $C_6$ olefin [1] plus tacky polypropylene | $C_6$ olefin [1] traces plus tacky polypropylene | $C_6$ olefin plus tacky polypropylene | $C_6$ olefin plus tacky polypropylene | $C_6$ olefin plus tacky polypropylene |
| Composition of dimer, mol percent: | | | | | | | |
| 4-methylpentene-1 | 7.6 | 2.3 | 4.5 | | 15.3 | 22.9 | 23.3 |
| Cis-4-methylpentene-2 | 7.4 | 5.2 | 4.5 | | 9.0 | 9.5 | 10.0 |
| 2,3-dimethylbutene-1 | 4.1 | 0.9 | 2.0 | | 4.4 | 5.9 | 4.8 |
| Trans-1-methylpentene-2 | 20.8 | 22.0 | 22.9 | | 40.4 | 35.3 | 32.8 |
| 2-methylpentene-1 | 6.9 | 3.0 | 7.8 | | 3.7 | 5.0 | 4.2 |
| Hexene-1 | 4.3 | 1.2 | 2.5 | | 2.0 | 3.0 | 3.0 |
| cis-Hexene-3 | 0.7 | 1.1 | 0.8 | | 0.2 | 0.3 | 0.3 |
| trans-Hexene-3 | 2.2 | 4.5 | 1.9 | | 0.7 | 0.8 | 0.9 |
| trans-Hexene-2 | 19.9 | 23.4 | 25.0 | | 13.2 | 10.0 | 11.1 |
| 2-methylpentene-2 | 9.6 | 20.3 | 7.2 | | 4.0 | 3.2 | 3.3 |
| cis-3-methylpentene-2 | 0.2 | Nil | 1.8 | | Nil | Nil | Nil |
| cis-Hexene-2 | 15.2 | 10.9 | 18.5 | | 6.8 | 5.3 | 6.1 |
| Trans-3-methylpentene-2 | Nil | Nil | Nil | | Nil | Nil | Nil |
| 2,3-dimethylbutene-2 | 1.1 | 5.2 | 0.6 | | 0.3 | (a) | 0.2 |
| Total | | | | | 101.2 | | |
| Percent normal hexenes in dimer | 42.3 | 41.1 | 48.7 | | 22.9 | 19.4 | 21.4 |
| Percent 1-olefin in dimer | 22.9 | 7.4 | 16.8 | | 25.4 | 36.8 | 35.3 | a Trace.

Gas phase product, (mostly n-butenes) was analysed by gas chromatography. A sample of the liquid product was hydrogenated for determination of carbon number spread. Other samples were split by preparative gas chromatography and examined by gas chromatography infra red and N.M.R. (one sample). Detailed gas chromatographic separation of hexadienes was achieved using the method of Miller.

The solvent used in the oligomerisation reaction, and ratio of aluminium (introduced as aluminium chloroalkyl) to nickel (introduced as the triphenyl phosphine complex of chloro-nickel silica) in the oligomerisation reactor, the quantities of butadiene added and ethylene used, the reaction temperature and the reaction time, togther with the results obtained are shown in Table 3 under runs 1 to 7.

In runs 1 to 4 n-nonane was used as solvent and carbon number distribution results may be affected by incomplete resolution of $C_9$. In run 7, after treatment of the chloro-nickel silica with aluminum chloroalkyl for 4½ hours at 50° C., unreacted chloroalkyl was washed out with solvent prior to admitting butadiene.

The composition of the $C_6$ fraction obtained in run 3 is given in Table 5.

EXAMPLE 3

Tributyl phosphine-chloro-nickel silica (TBP-chloro-nickel silica)

3.9 g. of chloro-nickel silica preparation made as in Example 1, part A, were heated 2 g. tri-butyl phosphine in toluene using the procedure of Example 2, part A. The resulting product was activated with aluminium chloroalkyl and about 1 g. used to co-oligomerize butadiene and ethylene as described in Example 2, part C. The conditions used and results obtained are shown in Table 4 under run 5.

EXAMPLE 4

Three experiments were carried out as in Example 2 except that instead of Davison Grade 969 silica, Grade 438 silica (made by Joseph Crosfield & Sons Ltd.) was used. The conditions used and results obtained are shown in Table 3 under runs 6 and 7.

EXAMPLE 5

An experiment was carried out in which acetyl-acetonate-nickel silica prepared as in Example 1, part B, was activated and used to co-oligomerise ethylene and butadiene as in Example 2, part C. The conditions used and results obtained are shown in Table 4 under run 3.

The major $C_8$ product obtained by co-oligomerisation of ethylene and butadiene are terminal $C_8H_{14}$ 1:3 dienes.

EXAMPLE III

In a comparative example not according to the invention two experiments were carried out in which chloro-nickel silica produced as in Example 1, part A, was fed to the reactor, treated with aluminium chloro-alkyl, and then with butadiene and ethylene, as in Example 2, part C. The conditions used and the results obtained are shown in Table 4 under runs 1 and 2.

EXAMPLE IV

In another comparative example not according to the invention a nickel oxide silica product was prepared by impregnating silica gel (Davison Grade 968, microspheroidal silica) with nickel nitrate to give a nickel content of 5% (expressed as nickel metal). The nickel nitrate was then converted to oxide by heating in a stream of dry air at 550° C. for 5–6 hours. The nickel oxide silica product was treated with triphenyl phosphine as in Example 2, part A.

TABLE 3

| Run Number | 1 | 2 | 3 | 4 | 5 | 6 | 7 |
|---|---|---|---|---|---|---|---|
| Catalyst | TPP/chloro-nickel silica | | | | | TPP/chloro-nickel silica | |
| Solvent | n-Nonane | | | | | n-Pentane | |
| Atomic ratio, Al/Ni | 4.0 | 2.0 | 6.0 | 6.0 | 6.0 | 6.0 | 6.0³ |
| Butadiene added, g | 6.0 | 47 | 30.5 | 14.4 | 13.1 | 21.9 | 17.2 |
| Etylene taken up, g | (ᵃ) | 7.5 | 14.7 | 28.8 | 32.8 | 31.7 | 6.0 |
| Reaction temperature, °C | 60 | 60 | 60 | 60 | 50 | 50 | 50 |
| Reaction time, (hours, approx.) | 24 | 24 | 24 | 24 | 22 | 24 | 16 |
| Weight liquid product formed ($C_4$, free basis) g | 6.0 | 35.6 | 42.5 | 36.0 | 30.2 | 30.6 | 8.6 |
| Carbon Number distribution as weight percent diene in liquid product: | | | | | | | |
| $C_6$ | (ᵇ) | (ᵇ) | 47.2 | 17.4 | 11.6 | 33.4 | |
| $C_8$ | (ᵇ) | (ᵇ) | 11.0 | 51.1 | 63.1 | 43.2 | |
| $C_{10}$ | (ᵇ) | (ᵇ) | 19.0 | 9.8 | 17.2 | 14.5 | |
| $C_{12}$ (excluding high polymer) | (ᵇ) | (ᵇ) | 4.7 | 3.6 | 8.1 | 8.9 | |
| $>C_{12}$ | (ᵇ) | (ᵇ) | 18.2 | 18.1 | (ᶜ) | Nil | |
| High polymer yield, g | 6 | 19 | Nil | Nil | Nil | | 8.6 |

ᵃ None added.
ᵇ No analysis carried out.
ᶜ Trace.

TABLE 4

| Run Number | 1 | 2 | 3 | 4 | 5 |
|---|---|---|---|---|---|
| Catalyst | Chloro-nickel-silica | | Ac-Ac chloro nickel silica | TPP/ nickel oxide/ silica | T.B.P. chloro-nickel silica |
| Solvent | n-Pentane | | | | |
| Atomic ratio, Al/Ni | 6.0 | 6.0 | 6.0 | 6.0 | 6.0 |
| Butadiene added, g | 18.3 | 12.0 | 6.4 | 12.8 | 24.8 |
| Ethylene taken up, g | 8.7 | 6.5 | 7.0 | 6.7 | 33.5 |
| Reaction temperature, °C | 50 | 60 | 50 | 50 | 50 |
| Reaction time, (hours, approx.) | 18 | 24 | 19 | 24 | 60 |
| Weight liquid product formed ($C_4$, free basis) g | Nil | Nil | 4.4 | Nil | 43.6 |
| Carbon Number distribution as weight percent diene in liquid product: | | | | | |
| $C_6$ | | | | | 61.3 |
| $C_8$ | | | | | 31.0 |
| $C_{10}$ | | | | | 6.8 |
| $C_{12}$ (excluding high polymer) | | | | | 0.9 |
| $>C_{12}$ | | | | | Nil |
| High polymer yield, g | Nil | Nil | 4.4 | Nil | |

The procedure of Example 2, part C, was then carried out on the resulting product. The conditions used and the results obtained are shown in Table 4, run 4.

TABLE 5

| Component: | Vol. percent |
|---|---|
| Trans hexene-2 | 1.4 |
| Unknown peak | 10.9 |
| Cis hexene-2 | 3.1 |
| Trans 3–MP–2 | 1.6 |
| Cis 3–MP–2 | 0.7 |
| Cis 1:4 hexadiene | 0.9 |
| Trans 1:4 hexadiene | 0.7 |
| 1:3 hexadiene | 0.3 |
| 2 Me 1:3 pentadiene | 2.9 |
| Trans, trans, 2:4 hexadiene | 30.0 |
| 4 Me 1:3 pentadiene | 2.9 |
| 3 Me cis 1:3 pentadiene | 3.1 |
| Cis, trans, 2:4 hexadiene | 28.3 |
| Cis cis 2:4 hexadiene | 9.3 |
| Others | 3.9 |

I claim:

1. A catalyst suitable for the polymerization of olefins which consists essentially of (a) a carrier selected from the group consisting of silica, alumina and silica/alumina, said carrier bonded through oxygen atoms to the transition metal component of a complex of a catalytically active transition metal of the first transition series and acetylacetone, the quantity of said metal being from 1 to 10%, by weight, of the carrier, and (b) an amount of an alkyl aluminium compound providing up to 2 gram atoms of aluminium per gram atom of transition metal.

2. A catalyst according to claim 1 wherein the transition metal is nickel and the ratio of aluminium to transition metal is from 0.8:1 to 1.2:1.

3. A catalyst according to claim 2 wherein the aluminium alkyl compound is an aluminium trialkyl.

4. The catalyst according to claim 3 wherein the aluminium trialkyl is aluminium triethyl.

5. A process for producing a catalyst suitable for the polymerization of olefins which comprises carrying out under substantially anhydrous conditions the successive steps of (i) reacting at a temperature of from 200° to 800° C. a carrier material selected from the group consisting of silica, alumina and silica/alumina having surface hydroxyl groups with a quantity of the halide of an active transition metal of the first transition series sufficient to bond from 1 to 10%, by weight, of metal through the oxygen atoms of the carrier, (ii) reacting the carrier-halide reaction product with acetylacetone, and (iii) bringing the resulting product into contact with a quantity of aluminium alkyl compound providing up to 2 gram atoms of aluminium per gram atom of transition metal.

6. The process according to claim 5 wherein the carrier is heated in a stream of inert gas at a temperature in the range 100° to 800° C. before use to remove part of the combined water from the carrier.

7. The process according to claim 6 wherein the carrier is silica and is heated to a temperature in the range 300 to 400° C.

8. The process according to claim 7 wherein the duration of the heating of the carrier is from 2 to 7 hours.

9. The process according to claim 5 wherein the transition metal halide reacted with the carrier is a chloride.

10. The process according to claim 5 wherein the transition metal halide is a nickel halide and the quantity of aluminium alkyl is sufficient to provide a ratio of aluminium to nickel of from 0.8:1 to 1.2:1.

11. The process according to claim 10 wherein the transition metal halide is nickel (II) chloride.

12. The process according to claim 5 wherein the transition metal halide is reacted with the carrier by impregnating the carrier with the halide and then heating the carrier at a temperature in the range 200 to 800° C.

13. The process according to claim 12 wherein the temperature is from 450 to 500° C.

14. The process according to claim 5 wherein the carrier halide reaction product is heated with the acetylacetone.

15. The process according to claim 14 wherein the carrier-halide reaction product is heated with the acetylacetone at temperatures in the range 60° to 120° C.

16. The process according to claim 15 wherein the duration of the reaction between the carrier-halide reaction product and the acetylacetone is in the range 2 to 24 hours.

17. The process according to claim 5 wherein the aluminium alkyl is an aluminium trialkyl.

18. The process according to claim 17 wherein the aluminium trialkyl is aluminium triethyl.

References Cited

UNITED STATES PATENTS

| 3,222,296 | 12/1965 | Aftandilian | 252—429 |
| 3,221,002 | 11/1965 | Orzechowski et al. | 252—430 X |
| 3,405,194 | 10/1968 | Iwamoto et al. | 252—429 B X |
| 3,482,001 | 12/1969 | Eberhardt | 252—429 B X |
| 3,511,891 | 5/1970 | Taylor et al. | 252—429 B X |
| 3,513,218 | 5/1970 | Faltings et al. | 252—431 P X |

PATRICK P. GARVIN, Primary Examiner

U.S. Cl. X.R.

252—429 B, 431 P; 260—85.3, 93.7, 94.9, 683.15